US008810102B2

(12) United States Patent
Reutlinger

(10) Patent No.: US 8,810,102 B2
(45) Date of Patent: Aug. 19, 2014

(54) ROTOR FOR AN ELECTRIC MACHINE WITH REDUCED DETENT TORQUE

(75) Inventor: Kurt Reutlinger, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 364 days.

(21) Appl. No.: 13/061,167

(22) PCT Filed: Jul. 21, 2009

(86) PCT No.: PCT/EP2009/059333
§ 371 (c)(1),
(2), (4) Date: May 19, 2011

(87) PCT Pub. No.: WO2010/023038
PCT Pub. Date: Mar. 4, 2010

(65) Prior Publication Data
US 2011/0210637 A1  Sep. 1, 2011

(30) Foreign Application Priority Data

Aug. 27, 2008 (DE) .................. 10 2008 041 604

(51) Int. Cl.
*H02K 21/04* (2006.01)
*H02K 29/03* (2006.01)
*H02K 16/02* (2006.01)
*H02K 1/27* (2006.01)
*H02K 1/26* (2006.01)
*H02K 21/16* (2006.01)

(52) U.S. Cl.
CPC ............... *H02K 29/03* (2013.01); *H02K 21/04* (2013.01); *H02K 1/276* (2013.01); *H02K 21/16* (2013.01); *H02K 16/02* (2013.01); *H02K 21/042* (2013.01)
USPC .................. 310/181; 310/156.44; 310/156.47

(58) Field of Classification Search
USPC .................. 310/181, 156.36, 156.37, 156.44, 310/156.47, 156.53, 156.56, 156.58, 310/156.25, 114
IPC ................ H02K 21/04,21/12, 21/14, 1/26, 1/27
See application file for complete search history.

(56) References Cited

U.S. PATENT DOCUMENTS 3,047,755 A * 7/1962 Angst et al. ................... 310/162
4,736,516 A   4/1988 Pfaffenzeller et al.
(Continued)

FOREIGN PATENT DOCUMENTS

CH        14547      4/1897
DE      3529050      4/1986
(Continued)

OTHER PUBLICATIONS

Machine translation of JP2000-308287 (published Nov. 2000, translated Jan. 2013).*

(Continued)

*Primary Examiner* — Michael Andrews
(74) *Attorney, Agent, or Firm* — Michael Best & Friedrich LLP

(57) ABSTRACT

The invention relates to an electric machine, in particular to a generator for supplying the electrical system of a motor vehicle, comprising a laminated rotor (20) with an energiser winding (29), which provides the energisation for the machine preferably in conjunction with permanent magnets (24, 25) arranged on the rotor periphery. According to the invention, the rotor laminate bundle (21) is made up of at least two part bundles (21a, b) in the axial direction with grooves (40) running into each other and with poles offset relative to each other (32 to 38). A machine with reduced detent torque is thus obtained with grooves (40) aligned parallel to the axis, in which the energiser windings (29) can be placed with a high filling factor and without production difficulties and without the risk of damaging the winding insulation.

8 Claims, 2 Drawing Sheets

(56) References Cited

U.S. PATENT DOCUMENTS

| | | | |
|---|---|---|---|
| 5,177,391 A | 1/1993 | Kusase | |
| 5,663,605 A * | 9/1997 | Evans et al. | 310/181 |
| 5,672,926 A * | 9/1997 | Brandes et al. | 310/181 |
| 6,147,429 A * | 11/2000 | Akemakou et al. | 310/181 |
| 6,271,613 B1 | 8/2001 | Akemakou et al. | |
| 2002/0175585 A1 | 11/2002 | Tagome et al. | |
| 2006/0119206 A1 | 6/2006 | Akemakou | |
| 2007/0090713 A1* | 4/2007 | Arita et al. | 310/181 |
| 2010/0207480 A1 | 8/2010 | Reutlinger | |

FOREIGN PATENT DOCUMENTS

| | | | | |
|---|---|---|---|---|
| DE | 8623917 | 7/1987 | | |
| DE | 102007025971.0 | 12/2008 | | |
| EP | 532769 | 3/1993 | | |
| EP | 0729217 | 8/1996 | | |
| EP | 1447901 A2 | 8/2004 | | |
| FR | 2780580 | 12/1999 | | |
| FR | 2856532 | 12/2004 | | |
| JP | 2000308287 A * | 11/2000 | | H02K 1/27 |
| JP | 2002247817 | 8/2002 | | |
| WO | 2004017496 | 2/2004 | | |

OTHER PUBLICATIONS

PCT/EP2009/059333 International Search Report, (Oct. 2010).

* cited by examiner

ROTOR FOR AN ELECTRIC MACHINE WITH REDUCED DETENT TORQUE

BACKGROUND OF THE INVENTION

The invention is based on an electric machine, such as is described in the older German patent application 10 2007 025 971.0. Such a hybrid-excited synchronous machine is suitable, in particular, for feeding the electrical system of motor vehicles, wherein in generator mode said synchronous machine is used with regulated induced voltage in a multi-phase stator winding system, and the poles of the rotor are excited permanently magnetically and/or electrically.

SUMMARY OF THE INVENTION

The electric machine according to the invention has the advantage that the proposed configuration of the rotor causes fluctuations in torque and noises of the machine caused by the variable forces acting on the stator teeth to be significantly reduced, wherein at the same time the advantage of simple insertion of the exciter winding into the grooves of the rotor by virtue of a direct winding method with a high filling factor of the grooves is retained. In contrast to a purely permanently magnetically excited machine with component magnets which are arranged in an offset fashion, such as is known, for example, from EP 1 447 901 A2, the combination of the permanently magnetic excitation with an exciter winding provides the significant advantage that the output power of the machine can be regulated with simple means with a comparatively small exciter current, which can easily be regulated, in the rotor winding and at the same time the high power density of a permanently magnetically excited machine can be used.

In order to reduce the detent torques, the electrically excited poles which are adjacent to a groove opening are preferably embodied each with different pole pitches here, while the remaining electrically or permanently magnetically excited poles on the rotor circumference are expediently embodied with the same pole pitch. In this context it is also advantageous that the aimed-at offset in the laminated rotor packet is achieved with a single sheet-metal cut for the laminations of the laminated rotor packet, solely by virtue of mirror-symmetrical layering of the pieces of sheet metal, while the aligned groove profile remains the same. In this way, with two different sheet-metal cuts it is possible to obtain four component packets of the laminated rotor packet which are offset with respect to one another, and with three different sheet-metal cuts it is possible to bring about a division into six component packets which are rotated with respect to one another, in each case with an unchanged, axis-parallel groove profile.

The different pole pitches for the electrically excited poles which adjoin the groove openings are advantageously selected here in such a way that the difference between the pole pitches is smaller than the distance between the detent positions of the rotor. The pole pitch of the permanently magnetically excited poles and of the electrically excited subsequent poles arranged therebetween is expediently located here in the region between the pole pitches of the electrically excited poles, with different widths, at the groove openings.

BRIEF DESCRIPTION OF THE DRAWINGS

An exemplary embodiment of the invention is illustrated in the drawings and will be explained in more detail in the following description.

In the drawings.

DETAILED DESCRIPTION

Figure 1:
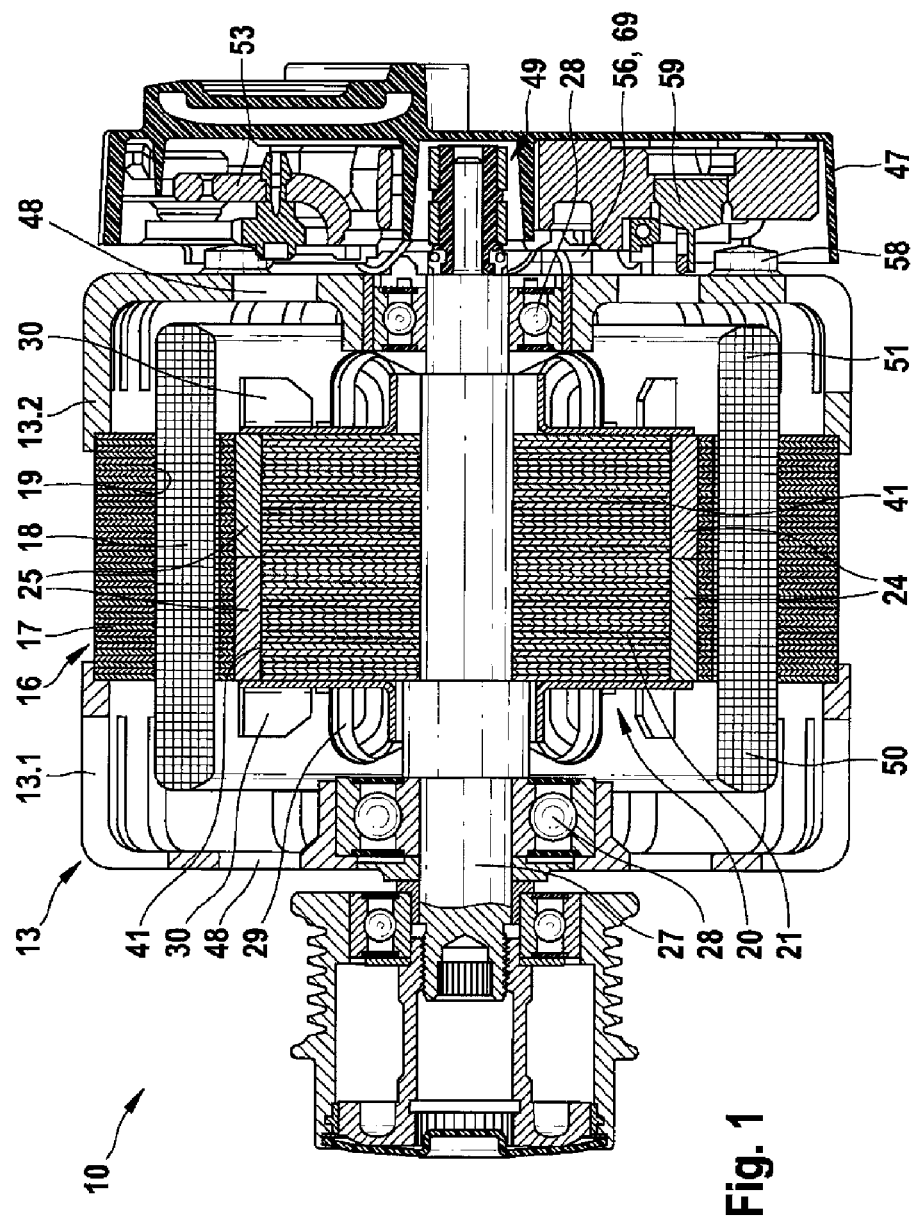
FIG. 1 shows a longitudinal section through an alternating current generator for motor vehicles with a hybrid-excited rotor in an alternating pole arrangement.

FIG. 1 is a schematic illustration of a section through an electric machine 10 in an embodiment as an alternating current generator for motor vehicles. Said alternating current generator has a two-component housing 13, which is composed of a first end plate 13.1 and a second end plate 13.2. The end plate 13.1 and the end plate 13.2 hold a stator 16, with a circular-ring-shaped laminated stator packet 17, in whose inwardly open and axially extending grooves 19 a stator winding 18 is inserted. The annular stator 16 surrounds, with its radially inwardly directed surface, a rotor 20 which is embodied as a hybrid-excited rotor. The stator 16 interacts here, across a working air gap, with the rotor 20 which is rotatably mounted in the stator 16.

The rotor 20 has, in a predefined sequence over its circumference, multiple north poles N and south poles S which are embodied by divided permanent magnets 24, 25 and by means of the exciter winding 29. In this context, the pole number of the rotor 20 can be changed as a function of the strength and direction of an exciter current in the exciter winding 29 and by the number of inserted permanent magnets.

The rotor 20 has a magnetically permeable body which is embodied as a divided laminated packet 21. The laminated rotor packet is laminated in the axial direction with a sheet-metal thickness between 0.1 mm and 2.0 mm. Below 0.1 mm, the resistance capability of the laminated packet 21 to centrifugal forces is too low. Above 2.0 mm, the reduction in the eddy current losses on the outer surface of the rotor 20 is no longer sufficient, which means that the installed permanent magnets 24, 25 can be damaged or demagnetized.

The axial length of the laminated rotor packet 21 preferably corresponds to the axial length of the circular-ring-shaped laminated stator packet 17, or up to 2 mm longer or shorter than the laminated stator packet 17 for tolerance compensation, and is preferably held together by weld seams. Instead of welds, it is also possible to use rivets or buttoned connections.

In the two-pole variant, the exciter winding 29 is preferably embodied as a diameter coil and is located in grooves which are punched out of the laminated packet 21. The exciter winding 29 can be inserted, for example as a flyer winding (double flyer) directly into the laminated rotor packet 21. Furthermore, regions 41 into which permanent magnets 24, 25 can be inserted are hollowed out in the laminated rotor packet.

According to the invention, the magnets 24, 25 are preferably inserted into punched-out pockets in the laminated rotor packet. This makes it possible to take up the centrifugal forces occurring during operation and as a result to ensure that the magnets are held reliably on the rotor. A material with a remanence induction of greater than 1 T proves to be particularly advantageous as a magnetic material. In particular, permanent magnets made of rare-earth material have these magnetic properties. The magnets are installed here in the rotor in such a way that they generate a substantially radial field. This field then crosses from the rotor via the air gap into the laminated stator packet and induces a voltage in the windings of the stator as the rotor rotates.

The rotor 20 is mounted rotatably in the respective end plates 13.1 and 13.2 by means of a shaft 27 and in each case a roller bearing 28 which is located on a rotor side. Said rotor 20 has two axial end faces, to each of which a fan 30 is attached. These fans are essentially composed of a plate-shaped or disk-shaped section, from which fan blades project in a known fashion. The fans 30 serve to permit air to be exchanged between the outside and the interior of the electric machine 10 via openings 48 in the end plates 13.1 and 13.2. For this purpose, openings 48 are provided at the axial ends of the end plates 13.1 and 13.2, via which openings 48 cooling air is sucked into the interior of the electric machine 10 by means of the fans 30. This cooling air is accelerated radially outward by the rotation of the fans 30, with the result that said cooling air can pass through the cooling-air-transmissive winding heads 50 on the drive side and cooling-air-transmissive winding heads 51 on the electronics side. The winding heads 50, 51 are cooled by this effect. After the cooling air has passed through the winding heads 50, 51 or after it has flowed around the winding heads, said cooling air adopts a radially outward path through openings (not illustrated).

On the right-hand side of FIG. 1 there is a protective cap 47 which protects various components against ambient influences. For example, this protective cap 47 covers a slip ring assembly 49 which supplies the exciter winding 29 with exciter current. A heat sink 53, which acts here as a positive heat sink, along which positive diodes 59 are mounted, is arranged around this slip ring assembly 49. The end plate 13.2 acts as what is referred to as a negative heat sink. A connecting plate 56, which connects the negative diodes 58 and positive diodes 59, attached in the bearing plate 13.2, to one another in the form of a bridge circuit 69 is arranged between the end plate 13.2 and the heat sink 53.

Figure 2A:
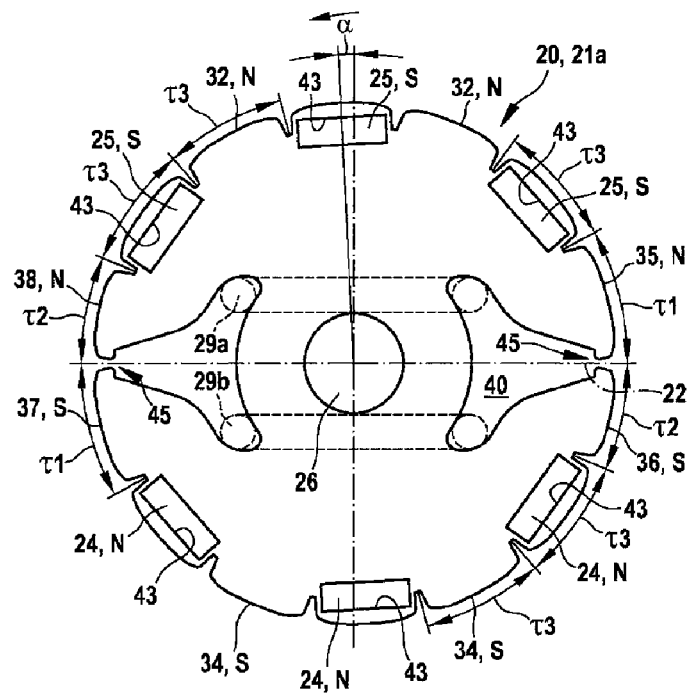
FIGS. 2a and 2b show views of two component packets of the laminated rotor packet for a machine with two-pole electrical excitation, with a total of 14 poles and with six permanently magnetically excited poles, wherein in the illustrations 2a and 2b the sheet-metal cut is the same in each case but the sheet-metal laminations are turned.
Figure 2B:
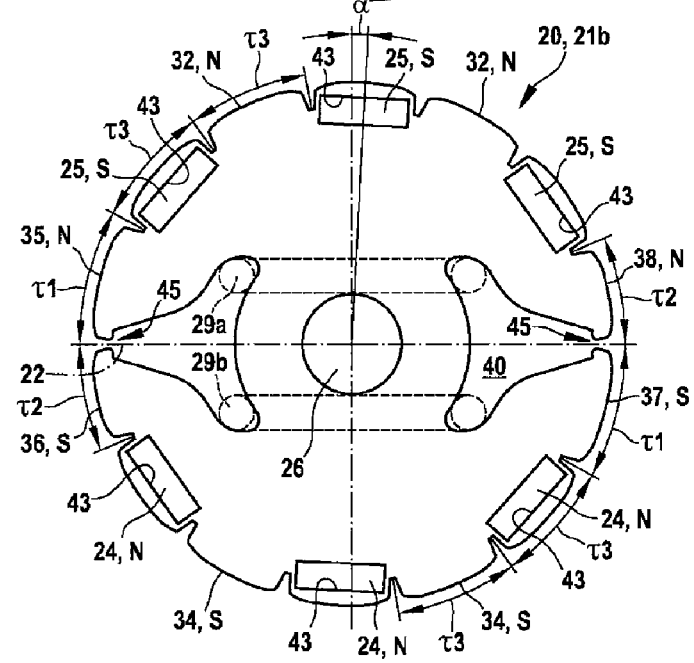

FIGS. 2a and 2b each show the same laminated rotor section, rotated through 180°, of an electric machine 10 with a total of 14 poles. The illustrations correspond here to the views of two component packets 21a and 21b of the laminated rotor packet 21, wherein the pole orientations are respectively rotated with respect to one another through the angle α, with the position of the groove center line 22 unchanged.

The rotor 20 has two-pole electrical excitation by means of an exciter winding 29, which is divided into two identical component coils 29a and 29b which are arranged symmetrically on both sides of an opening 26 for the rotor shaft (not illustrated). The basic excitation of the machine is carried out via a total of eight electrically excited poles, wherein in FIGS. 2a and 2b the four upper poles 32, 35 and 38 form north poles, and the four lower poles 34, 36 and 37 form south poles. Between the electrically excited poles, the sheet-metal cut has projections which correspond to the poles 32 and 34 and which have pocket-shaped cutouts 43 for the insertion of permanent magnets 24 and 25, wherein the permanent magnets 24 form north poles and the permanent magnets 25 form south poles on the rotor circumference, respectively alternating with the electrically excited poles.

The sheet-metal cut for the component packets 21a and 21b of the laminated rotor packet in FIGS. 2a and 2b is the same, but the laminations are rotated through 180°. In this context, the shape and the center line 22 of the grooves 40 remains unchanged, with the result that they extend in alignment over the entire axial length of the rotor 20, while the poles 32-38 in the two component packets 21a and 21b are offset with respect to one another owing to different pole pitches τ1 and τ2 of the poles 35-38. In the axial direction, an electrically excited component pole with the pole pitch τ2 adjoins an electrically excited component pole with the pole pitch τ1, and vice versa, as a result of which the permanent magnet poles 24 and 25 and the electrically excited subsequent poles 32 and 34 located therebetween are respectively rotated with respect to one another through an angle α which corresponds to the different magnitudes of the pole pitches τ1 and τ2.

The magnitude of the pole pitch τ1 for the wider groove edge poles 35 and 37, τ2 for the narrower groove edge poles 36 and 38 and τ3 for the permanent magnet poles and the electrically excited subsequent poles located therebetween is selected in such a way that the pole pitch τ3 is in the range between the magnitude of the pole pitches τ1 and τ2. In this context, the difference τ1−τ2 of the pole pitches τ1 and τ2 of the electrically excited poles 35-38 is to be smaller than or at maximum of equal magnitude to the distance between the detent positions of the rotor 20, which is itself determined by the number of rotor poles and the number of stator teeth. The detent distance here results from the quotient of the rotor circumference and of the smallest common multiple between the number of rotor poles and the stator teeth. In the exemplary embodiment illustrated in FIGS. 1 and 2, the stator 42 has teeth, and the rotor 14 has poles. The smallest common multiple here is the tooth number 42, with the result that the distance between the detent positions of the rotor 20 in this exemplary embodiment is 1/42 of the rotor circumference, or of the air gap length.

In terms of manufacturing technology and structure, it is advantageous if the laminated rotor packet 21 has, in the axial direction, at least two component packets 21a and 21b and at most six component packets. With two component packets, a significant reduction in the torque fluctuations and the noises of the engine is already achieved, and with more than six component packets the improvements no longer justify the difficulties and costs in terms of the manufacture of the rotor. In this context, a groove shape with a substantially bell-shaped cross section has proven advantageous in particular in the case of two-pole electrical excitation of the rotor 20, because with this groove shape it is particularly easy to wind the grooves with a high filling factor, and symmetrical apportioning of the winding on both sides of the rotor shaft can be implemented particularly easily. Together with the mirror-symmetrical design of the laminated rotor packet 21, this also allows the unbalance to be minimized during operation of the machine.

In the exemplary embodiment, the rotor 20 has, in addition to the electrical excitation, six poles which are excited by permanent magnets 24 and 25 and which have the same pole pitch τ3 as the electrically excited subsequent poles 32 and 34 located therebetween. However, instead it is also possible to provide four or eight permanent magnets 24, 25 in a symmetrical arrangement on the rotor circumference. Furthermore, in the case of a relatively small power requirement of a standardized machine design there is the possibility of providing, instead of individual pocket-shaped cutouts 43 or all the pocket-shaped cutouts 43, corresponding gaps not equipped with permanent magnets, in order to be able to manufacture the machine more cost-effectively with a lower power requirement.

The invention claimed is:
1. An electric machine, comprising:
a laminated stator (16) with a multi-phase stator winding (18); and
a laminated rotor (20) with an exciter winding (29) which is arranged in grooves (40) and supplies the excitation of the machine together with permanent magnets (24, 25) arranged on a circumference of the rotor, characterized in that the rotor includes a laminated rotor packet (21) which is divided in an axial direction into at least two component packets (21*a, b*) with the grooves (40) being aligned with one another and includes poles (32-38) which are offset with respect to one another, and characterized in that a pole pitch ($\tau 3$) of permanently magnetically excited poles (24, 25) and electrically excited subsequent poles (32, 34) which are arranged therebetween are equal in magnitude.

2. The electric machine as claimed in claim 1, characterized in that the pole pitch ($\tau 3$) of the permanently magnetically excited poles (24, 25) and of electrically excited subsequent poles (32, 34) is located in a region between the pole pitches ($\tau 1, \tau 2$) of the electrically excited poles (35-38), with different widths, at the groove openings (45).

3. The electric machine as claimed in claim 2, characterized in that a difference between pole pitches ($\tau 1 - \tau 2$) of electrically excited poles (35-38) at groove openings (45) is smaller than a distance between detent positions of the rotor (20).

4. The electric machine as claimed in claim 3, characterized in that the laminated rotor packet (21) has at least two and at most six component packets (21*a, b*) in the axial direction.

5. The electric machine as claimed in claim 4, characterized in that the grooves (40) of the rotor (20) are configured substantially in a bell shape.

6. The electric machine as claimed in claim 5, characterized in that the rotor (20) has two-pole electrical excitation and two grooves (40) in which a rotor winding (29) composed of two component coils (29*a, b*) which are arranged substantially symmetrically with respect to a rotor shaft (27) is located.

7. The electric machine as claimed in one claim 6, characterized in that the rotor (20) has, in addition to electrical excitation, four, six or eight permanent magnets (24, 25) which are arranged in cutouts (43) on the rotor circumference.

8. An electric machine, comprising:
a laminated stator (16) with a multi-phase stator winding (18); and
a laminated rotor (20) with an exciter winding (29) which is arranged in grooves (40) and supplies the excitation of the machine together with permanent magnets (24, 25) arranged on a circumference of the rotor;
characterized in that the rotor includes a laminated rotor packet (21) which is divided in an axial direction into at least two component packets (21*a, b*) with the grooves (40) being aligned with one another and includes poles (32-38) which are offset with respect to one another;
characterized in that electrically excited poles (35, 36; 37, 38) which are adjacent to a groove opening (45) have different pole pitches ($\tau 1, \tau 2$);
characterized in that alternately electrically excited poles (32-38) and cutouts (43) for holding permanent magnets (24, 25) in order to form permanently magnetically excited poles are arranged on the rotor circumference in the component packets (21*a*, 21*b*) of the laminated rotor packet (21); and
characterized in that a pole pitch ($\tau 3$) of permanently magnetically excited poles (24, 25) and electrically excited subsequent poles (32, 34) which are arranged therebetween are equal in magnitude.

* * * * *